US007725839B2

(12) United States Patent  
Michaels

(10) Patent No.: US 7,725,839 B2
(45) Date of Patent: May 25, 2010

(54) THREE-DIMENSIONAL ACTIVE FILE EXPLORER

(75) Inventor: Joshua M. Michaels, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 229 days.

(21) Appl. No.: 11/273,744

(22) Filed: Nov. 15, 2005

(65) Prior Publication Data

US 2007/0124699 A1 May 31, 2007

(51) Int. Cl.
G06F 3/048 (2006.01)
(52) U.S. Cl. .................. 715/836; 715/849; 715/767
(58) Field of Classification Search ......... 715/767, 715/849, 823, 836
See application file for complete search history.

(56) References Cited

U.S. PATENT DOCUMENTS

| | | | |
|---|---|---|---|
| 5,303,388 A * | 4/1994 | Kreitman et al. | 715/836 |
| 5,339,390 A * | 8/1994 | Robertson et al. | 715/782 |
| 5,452,414 A * | 9/1995 | Rosendahl et al. | 715/836 |
| 5,485,197 A * | 1/1996 | Hoarty | 725/37 |
| 5,515,486 A * | 5/1996 | Amro et al. | 715/848 |
| 5,678,015 A * | 10/1997 | Goh | 715/782 |
| 5,713,021 A * | 1/1998 | Kondo et al. | 707/103 R |
| 5,724,492 A * | 3/1998 | Matthews et al. | 345/419 |
| 6,043,818 A * | 3/2000 | Nakano et al. | 715/851 |
| 6,157,371 A * | 12/2000 | Smeets | 345/168 |
| 6,198,483 B1* | 3/2001 | Launais | 715/848 |
| 6,404,443 B1* | 6/2002 | Westerman | 715/776 |
| 6,523,048 B2* | 2/2003 | DeStefano | 715/526 |
| 6,597,358 B2* | 7/2003 | Miller | 345/427 |
| 6,621,509 B1* | 9/2003 | Eiref et al. | 715/836 |
| 6,710,788 B1* | 3/2004 | Freach et al. | 715/778 |
| 6,774,914 B1* | 8/2004 | Benayoun | 345/650 |
| 6,804,686 B1 | 10/2004 | Stone et al. | 707/104.1 |
| 6,880,132 B2* | 4/2005 | Uemura | 715/848 |
| 6,922,815 B2* | 7/2005 | Rosen | 715/782 |
| 6,938,218 B1* | 8/2005 | Rosen | 715/850 |
| 7,103,850 B1* | 9/2006 | Engstrom et al. | 715/778 |
| 7,134,092 B2* | 11/2006 | Fung et al. | 715/779 |
| 7,134,095 B1* | 11/2006 | Smith et al. | 715/860 |
| 7,168,051 B2* | 1/2007 | Robinson et al. | 715/848 |
| 7,216,305 B1* | 5/2007 | Jaeger | 715/849 |
| 7,290,213 B2* | 10/2007 | Kake et al. | 715/738 |
| 2002/0067378 A1* | 6/2002 | Abdelhadi et al. | 345/836 |

(Continued)

FOREIGN PATENT DOCUMENTS

WO    WO 01/01350 A1    1/2001

(Continued)

OTHER PUBLICATIONS

Alteros 3D 2.3, Lighttek Software, http://www.lighttek.com/alteros, 1997-2005©, 4 pages.

(Continued)

Primary Examiner—Tadesse Hailu
Assistant Examiner—Nicholas S Ulrich
(74) Attorney, Agent, or Firm—Woodcock Washburn LLP

(57) ABSTRACT

A three-dimensional object that represents computer data and methods and computer-readable media for presenting same. The object has a first, active side and a second, inactive side. The active side may contain information relating to the computer data.

20 Claims, 11 Drawing Sheets

U.S. PATENT DOCUMENTS

| | | | |
|---|---|---|---|
| 2003/0142136 A1 | 7/2003 | Carter et al. | 345/782 |
| 2004/0135820 A1 | 7/2004 | Deaton et al. | 345/848 |
| 2005/0060351 A1 | 3/2005 | Rahman | 707/104.1 |
| 2005/0091596 A1 | 4/2005 | Anthony et al. | 715/712 |
| 2005/0160373 A1 | 7/2005 | Chakravarty et al. | 715/827 |
| 2005/0179705 A1 | 8/2005 | Ubillos et al. | 345/671 |
| 2007/0061732 A1* | 3/2007 | Bobbin et al. | 715/739 |

FOREIGN PATENT DOCUMENTS

WO     WO 02/093352 A1     11/2002

OTHER PUBLICATIONS

Welcome to 3DNA, http://www.3dna.net/index.html, 2004, 2 pages.

* cited by examiner

THREE-DIMENSIONAL ACTIVE FILE EXPLORER

BACKGROUND

Major operating systems typically include a "file explorer," which is an application that enables a user to view folders and files, perform actions, launch applications, search storage media and so forth within a graphical user interface (GUI). In a conventional file explorer, a file or folder is commonly represented as a two-dimensional (2-D) icon with some additional information such as a file name or type displayed next to it. A user may click on the icon to perform an operation on the file or folder. Because there is a limit to the size of the icon (in many cases, 64×64 pixels) and the amount of space available for relevant data (e.g., file name, type, size, etc.), additional information about the file and how it can be used are displayed at other locations in the explorer.

Conventionally, this auxiliary file information is displayed in a "right-click menu" and a "left hand pane." The right-click menu (i.e., the menu that appears upon the user clicking on the icon with a right mouse button) typically provides available file actions and a link to a properties menu. The left hand pane (i.e., an information area typically displayed on the left side of the file explorer) usually displays additional metadata and actions.

The 2-D icon approach to displaying file or folder information forces a user to look somewhere other than to the icon for such information. For example, a user must either discover that a right-click exposes some additional file information or must look off to the side to the left hand pane. This poses a discoverability problem for many users. Namely, because this information is not displayed directly in context with the icon, users often ignore or forget about it. Thus, useful information may go undetected and/or unused because the user is not reminded of its availability by the icon.

SUMMARY

An embodiment provides a three-dimensional object that represents computer data, such as a computer file or folder. The object may have any number of sides, and any one or more of which may be selected as active at a given time. The other side(s) may be inactive and may or may not be within view. The active side may contain information relating to the computer data, and a user input with respect to the object or information may cause a change to the object or an action to be taken with respect to the computer data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
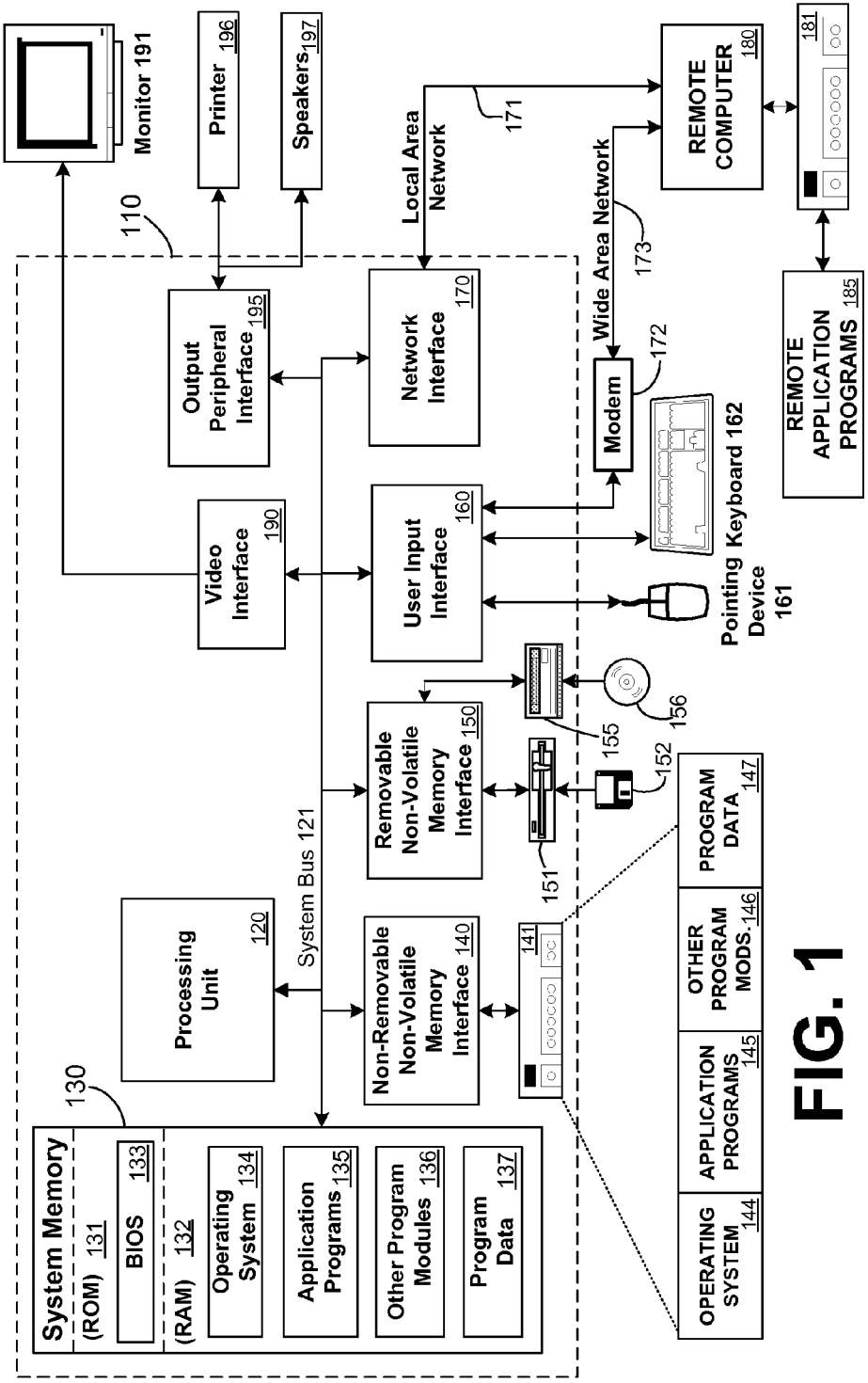
FIG. 1 is a diagram illustrating an example computing environment in which aspects of the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile-and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146 and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Two-Dimensional Icons

Figure 2A:
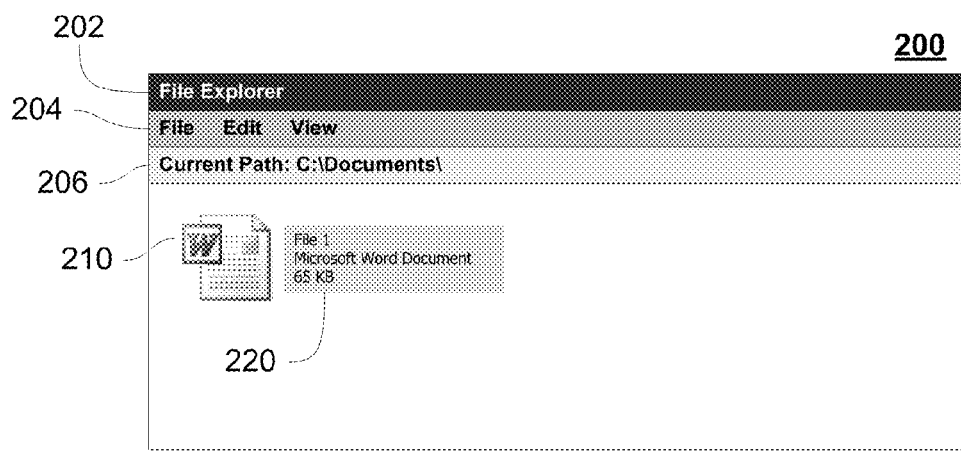
FIGS. 2A-C are diagrams illustrating two-dimensional file information displays.
Figure 2B:
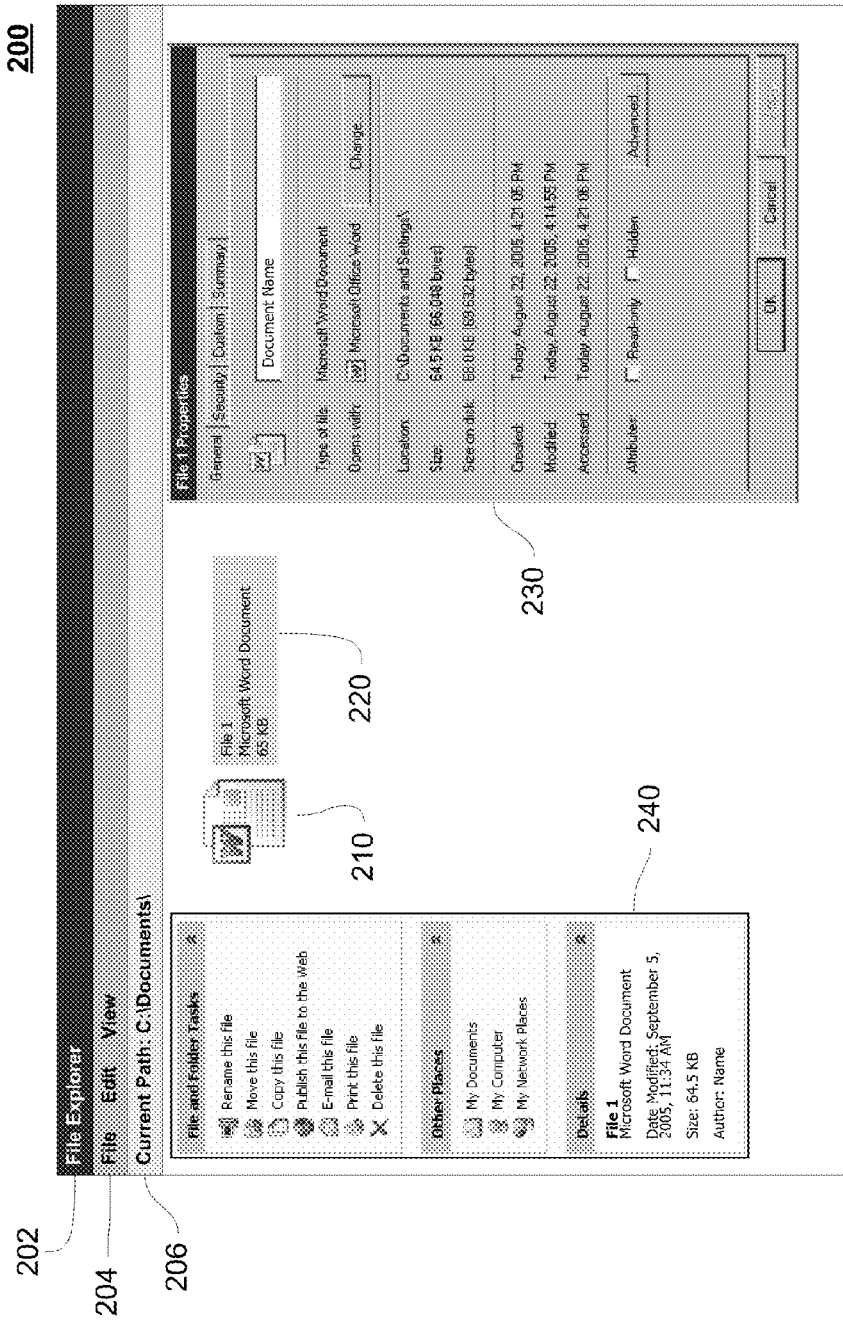
Figure 2C:
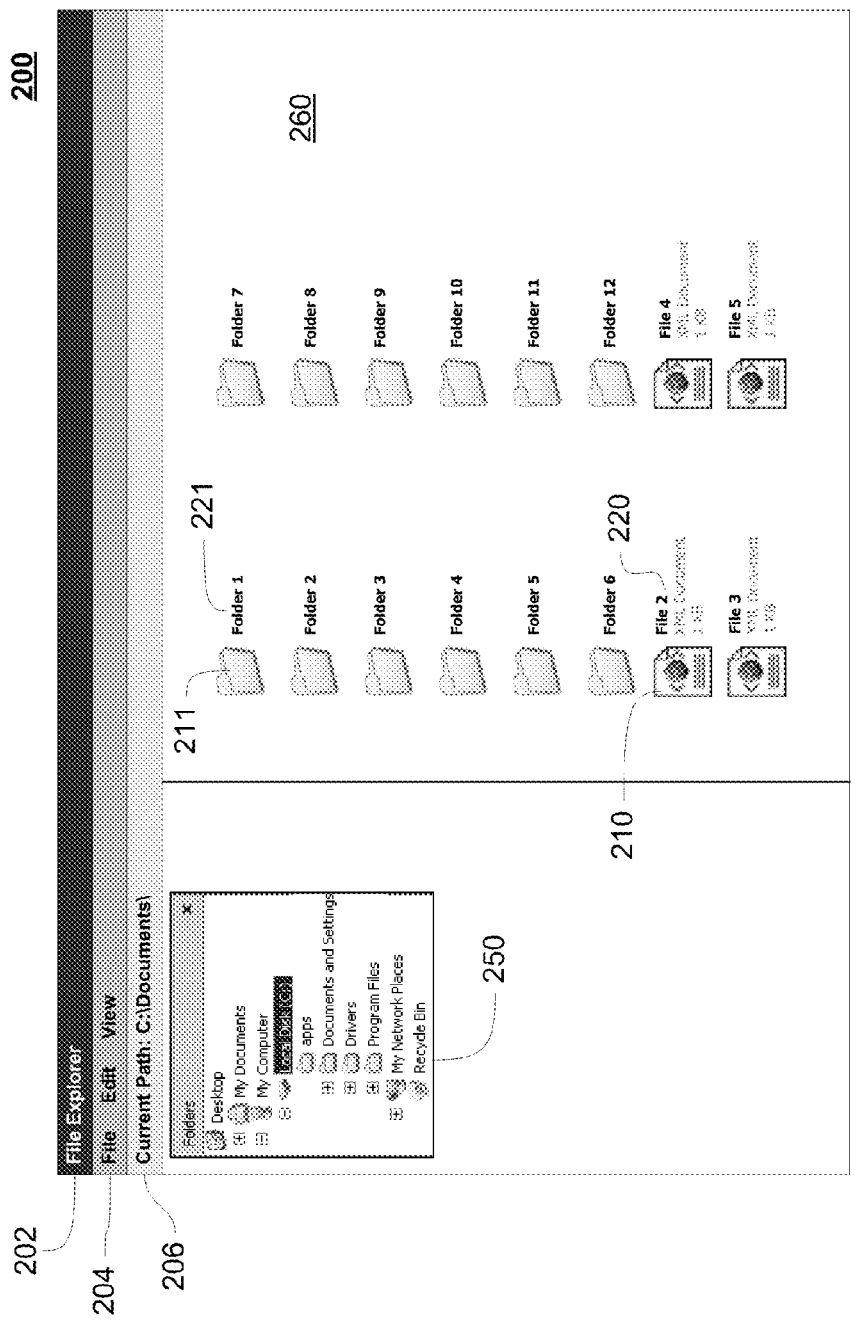

For purposes of comparison and explanation, FIGS. 2A-C illustrate 2-D file icon and file explorer configurations. In FIG. 2A, file explorer view 200 displays an example file explorer window 202. Within file explorer window 202 are tools 204 that enable manipulation of window 202 and its contents. Path 206 shows the location within a storage medium that is displayed by window 202. Viewing area 260 displays file icon 210, which is a 2-D representation of a file (in FIG. 2A the file is an example MICROSOFT WORD® document). Next to file icon 210 in viewing area 260 is file data 220, which displays the file name, type and size. As can be seen, the information provided by data 220 is limited and no further options or actions with respect to the file are provided by file icon 210.

FIG. 2B again displays view 200 and viewing area 260, along with menu 230 and pane 240. Menu 230 is shown as a typical right-click menu that lists detailed file information as well as additional settings and actions that may be taken with respect to the file. As discussed above, menu 230 is displayed upon a user right-clicking on file icon 210, or sometimes file data 220. Pane 240 provides additional metadata and file actions. It can be seen that menu 230 and pane 240 display information that is largely unavailable in file icon 210 or data 220.

FIG. 2C again displays view 200, along with viewing area 260 and pane 250. Viewing area 260 displays a plurality of folders represented by folder icon 211 and folder data 221. It can be seen that folder icon 211 and folder data 221 correspond to file icon 210 and file data 220, respectively, with appropriate modifications made to represent a folder. Pane 250 shows a tree view of folders. Again, menu 230 and pane 240 display information that is largely unavailable in file icon 210, file data 220, folder icon 211 or folder data 221.

Example Embodiments

Figure 3:
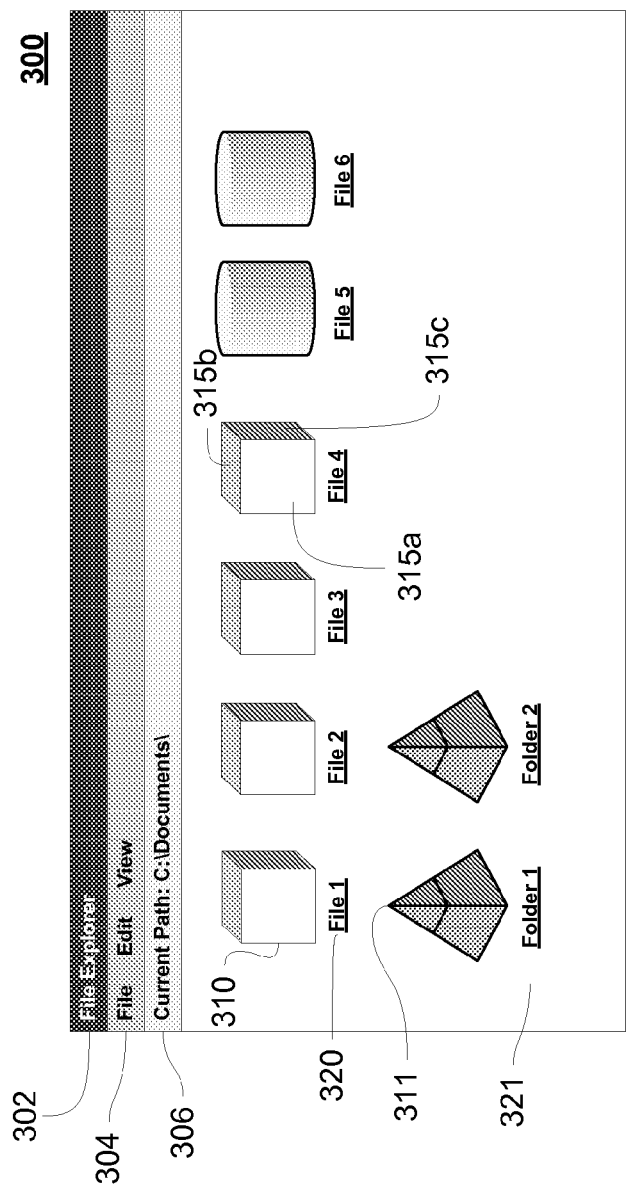
FIG. 3 is a diagram illustrating an example file information display in accordance with an embodiment.

In the discussion that follows, it is assumed that one skilled in the art is familiar with GUIs, GUI objects and methods for programming same. Thus, details relating to such matters are omitted herein for clarity. FIG. 3 shows an example view 300 according to an embodiment. View 300 includes file explorer window 302, which may include tools 304 and path 306. Tools 304 and path 306 may, for example, operate in a similar manner to tools 204 and path 206 discussed above in connection with FIGS. 2A-C.

It can be seen that files are represented in viewing area 360 as three-dimensional (3-D) file objects 310 having file data 320. Folder object 311 and folder data 321 correspond to object 310 and file data 320, discussed above, except that folder object 311 and folder data 321 represent a folder that itself may contain additional files, folders and/or the like. File and folder object 310, 311 may be any type of GUI object such as, for example, a "widget." A widget is a control that may be manipulated by a user within a GUI. In the discussion that follows, unless explicitly stated otherwise, a reference to the characteristics, properties and the like of file object 310 or folder object 311 is intended to refer to either object 310 or 311 interchangeably. In other words, in an embodiment, the objects used to represent a file or folder may differ in their content so as to accurately represent the different actions and properties that are available for each (e.g., different actions may be available for a folder as compared to a file), but the overall principles governing the behavior and characteristics of the objects themselves may be the same or similar.

It will be appreciated that in an embodiment objects 310 and 311 may be two-dimensional representations of three-dimensional objects, so as to enable object 310 to be displayed on a two-dimensional display device such as a computer monitor or the like. Thus, perspective and/or other visual techniques may be used to represent the three-dimensional nature of object 310. In addition, the term 3-D herein can refer to objects 310 and 311 appearing to have height, width and depth within viewing area 360 or to the characteristic of objects 310 and 311 having more than one "side," as will be discussed below in connection with sides 315*a-c*.

Thus, even an object 310 or 311 that is simply represented as a 2-D object (e.g., a square) may be considered 3-D according to an embodiment. In view 300, file objects 310 are shown as cubes and cylinders, while folder objects 311 are shown as pyramids. It will be appreciated, however, that these shapes are for illustration purposes only, as any type or shape of object 310 and/or 311 is consistent with an embodiment.

The example objects 310 and 311 discussed herein use common shapes such as cubes, cylinders, pyramids and the like, but an embodiment contemplates that objects 310 and 311 may take any shape. For example, object 310 or 311 may be displayed as a completely arbitrary shape such as a 3-D game logo, a game character, a picture and so forth. Objects 310 and 311 may have more or fewer sides than a "real" object of the same shape. For example, a cube is defined as a 3-D shape with six square or rectangular sides. However, a file or folder represented by object 310 or 311, respectively, may only require three sides to display all desired or possible information relating to the file or folder. Thus, the object "cube" would only have three sides. Likewise, the file or folder represented by an object 310 or 311 may require more than six sides to display the related information. In such a case, therefore, the object cube would have more than six sides. In an alternate embodiment, the shape of object 310 and 311 can be selected so the number of object sides correspond exactly to the number of sides required by the file or folder's information.

Thus, returning to FIG. 3, objects 310 and 311 may have one or more sides 315*a-c*. In FIG. 3, the cube-shaped objects 310 are shown having an active (or default) side 315*a*, which is the side facing a user, as well as inactive sides 315*b-c*, which are shown in a recessed fashion to simulate the three-dimensional nature of object 310. Thus, it can be said that side 315*a* is in an active position of object 310, while sides 315*b-c* are in inactive positions. It will be appreciated that additional inactive sides 315 may be present but not viewable in view 300. Data 320 and 321 can be a file name, file type, label, listing or the like. In addition, data 320 and 321 may be displayed on a surface of object 310 or 311, respectively. For example, in an embodiment file data 320 may include the file's name and location within a storage device, as well as a thumbnail image of the file, if appropriate. If displayed on object 310, file data 320 may be displayed on one or more sides 315*a-c*. Information provided by inactive sides 315*b-c*, or simply the appearance of inactive sides 315*b-c* themselves, may provide a reminder to a user that additional information is available by way of object 310 or 311.

Figure 4:
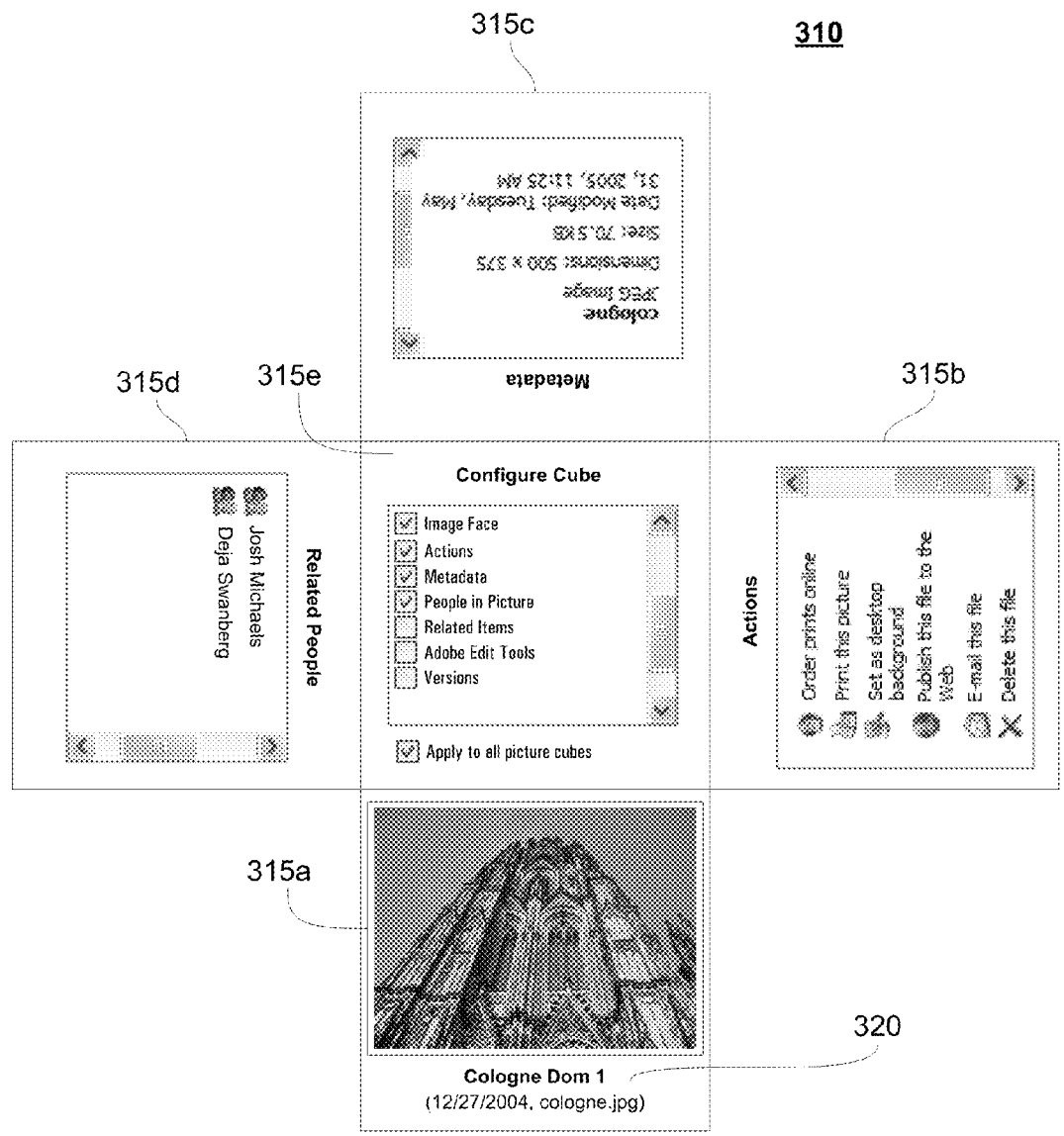
FIG. 4 is a diagram illustrating an example file object in accordance with an embodiment.

FIG. 4 illustrates object 310, which is illustrated in FIG. 4 as an image file. Again, it will be appreciated that object 360 may represent any type of file. As noted above, object 310 can have any shape, but is illustrated as a cube in FIG. 4 solely for purposes of explanation. Each side 315*a-e* represents a different set of actions and/or information that may pertain to the file. In an embodiment, side 315*a* is a default side of object 310 that is typically shown to a user when in viewing area 360 of FIG. 3, for example. Side 315*a* includes a thumbnail image, as well as file data 320. Side 315*b* provides a list of actions that may be taken with respect to the file. It will be appreciated that 315*b* may also provide unavailable actions that may be represented as such by using a different text font, color or the like. In one embodiment, side 315*b* may be made active by right-clicking on side 315*b*. In such a manner, a user who is accustomed to right-clicking on 2-D icons would be presented with similar information when right-clicking on object 310. Side 315*c* provides file metadata, and side 315*d* provides people that are related to the file. Finally, side 315*e* provides object configuration data. It can be seen in side 315*e* that object 310 may be tailored for the specific file represented by object 310, or for all files of the same type, for example. Thus, it can be seen that object 310 alone can provide the functionality of file icon 210, menu 230 and/or pane 240. The ability of a user to select each side 315a-e is discussed below in connection with FIGS. 6A-F.

Figure 5:
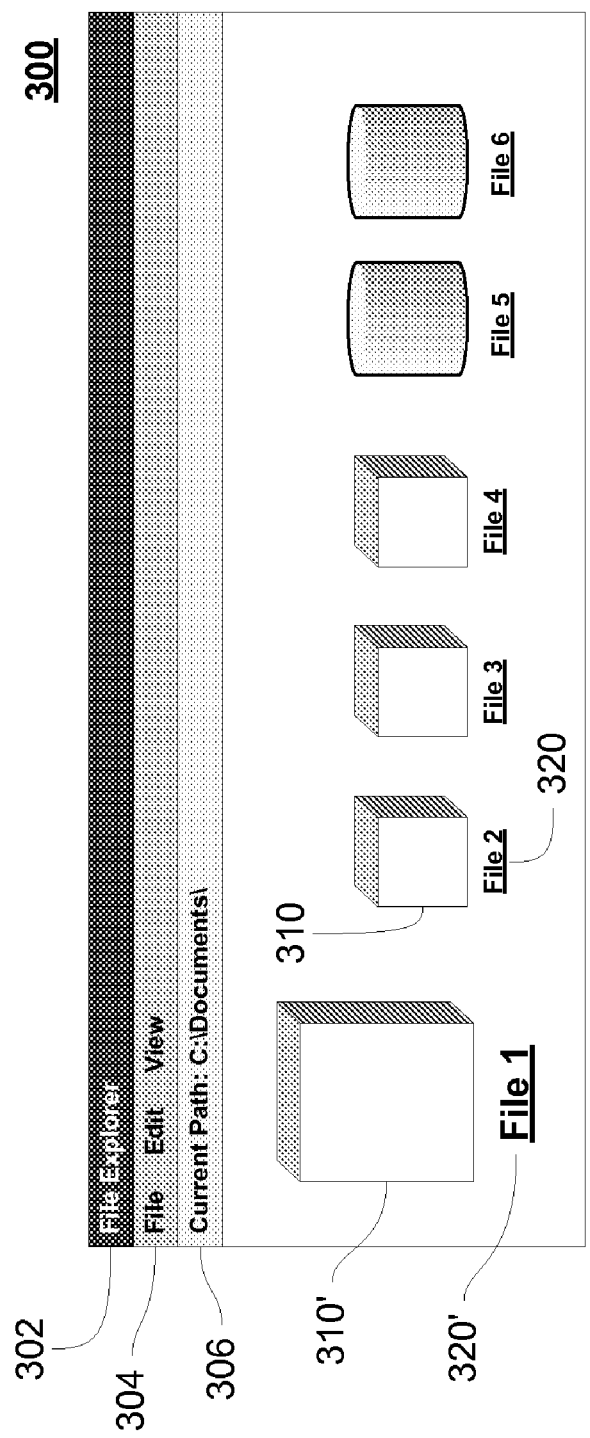
FIG. 5 is a diagram illustrating an example file information display with a selected object in accordance with an embodiment.

FIG. 5 represents view 300 in which object 310' is selected. Object 310' is shown as selected by being made larger in size than surrounding, unselected objects 310. File data 320' of selected object 310' is shown in a larger, more prominent font. Any manner of contrasting a selected object 310' from unselected objects 310 may be used in connection with an embodiment. For example, rather than (or in addition to) increasing the size of object 310', the appearance of 310' may change in another manner such as, for example, changing color, brightness or the like. Animation (e.g., spinning, etc.) and/or sound may also be used upon selecting object 310' to signify a transition between the unselected and selected states to represent that object 310' has been selected. File data 320', if present, may be so contrasted in a similar fashion.

In addition, unselected objects 310 may also change in appearance to contrast with selected object 310' by changing color, reducing in size, etc. Such objects 310 may also displace around selected object 310', particularly in embodiments where selected object 310' increases in size. Unselected, or idle, objects 310 may remain still or may be animated, and the contents, appearance, properties or the like of any of objects 310 or 310' may change or be updated by user or other activity.

When a selected object 310' is deselected, its appearance may return to normal so that object 310' again resembles unselected objects 310. For example, object 310' may return to its original size and objects 310 around object 310' may return to their original location and size to compensate. Again, animation and/or sound may be used as to signify a transition between the selected and unselected states to represent that object 310' has been deselected. Deselection may occur, for example, when a user clicks somewhere within viewing area 360 other than on selected object 310'.

Once an object has been selected, a user may wish to view or interact with the other sides of the object to access such side's information (it will be appreciated that "information" may relate to any type of information, functionality, options, actions, or the like, that may be used in connection with the file or folder represented by objects 310 or 311). FIGS. 6A-F represent various non-limiting example methods of user interaction and manipulation with file or folder object 310 or 311. In an embodiment, such interaction occurs while such file or folder object 310 or 311 is selected. It is possible that the interaction itself also serves to select object 310 or 320, so that object 310 or 320 need not be selected beforehand. It will be appreciated that the methods presented herein are for purposes of explanation and illustration only, as any manner of interacting with objects 310 or 311 is contemplated. (Again, references below to object 310 refer equally to file objects 310 or folder objects 311.) For example, the examples of FIGS. 6A-F are explained in the context of a user operating a mouse or other pointing device. In an alternate embodiment, a user may use voice control, an assistance device or the like. In addition, the examples of FIGS. 6A-F are designed to provide functionality that is similar to that which would be obtained in a conventional file explorer if the same actions are taken by the user. Thus, a user that is familiar with the additional information provided by a right-click menu and left hand pane would not have to learn new click or key combinations to obtain the same information. Accordingly, a user transition to using file and folder objects 310 and 311 would be eased. Alternate embodiments may use partially or entirely new click combinations and the like.

Figure 6A:
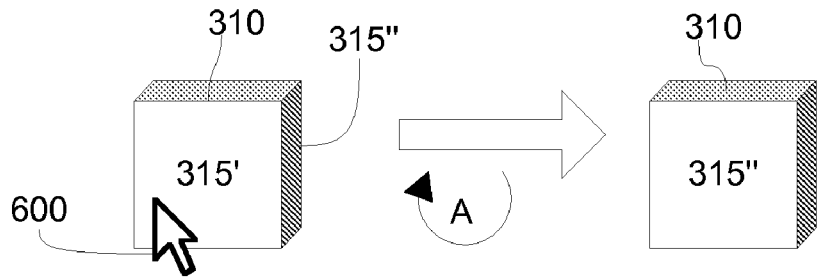
FIGS. 6A-F are diagrams illustrating example object interactions in accordance with an embodiment.

FIG. 6A illustrates an example user interaction with object 310 involving a right-click on object 310. Side 315' refers to an active side of object 310 that is presented in full-view prior to a transition to side 315", which is the side of object 310 that becomes active after the user interaction. It can be seen that, in an embodiment, right-clicking on object 310 (i.e., right-clicking while a cursor 600 or the like is placed substantially over a selectable region corresponding to object 310) causes a rotation, indicated by rotation arrow A, from side 315' to 315". As noted above, the user can see side 315" prior to the user interaction, which may remind the user that the information that is present on side 315" is available. As was also noted above, some type of transition may occur such as, for example, object 310 may rotate or otherwise animate as it switches between active side 315' and 315". The information that is presented by side 315" may, in an embodiment, be the same or similar to that provided by a conventional right-click menu to avoid user confusion.

Figure 6B:
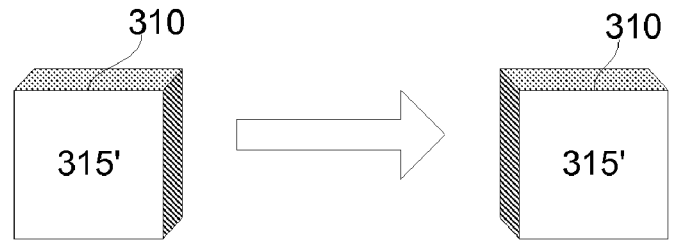

FIG. 6B illustrates an example user interaction with object 310 that occurs if the user wishes to view inactive sides of object 310, if present. Side 315' is the currently active side of object 310. In an embodiment, a user may take some action such as, for example, pressing some Shift key combination (e.g., Shift-hold, which may be the Shift key by itself or a Shift-Combination, etc.) Thus, object 310 is slightly rotated to the right exposing an additional side of object 310 if one is present. It can be seen that side 315' remains the active side. Thus, a user may view available sides of object 310 without actually selecting them. The user interaction illustrated in FIG. 6B may operate in a toggle fashion, where the additional side(s) are only shown while the Shift key combination is depressed, or successive presses of the Shift key combination may continue to slightly rotate object 310 to expose additional, inactive sides to the user. It will be appreciated that an embodiment is not limited to rotation of object 310, as any other manner of presenting inactive sides of object may be used (e.g., inactive sides may slightly enlarge out of a side of object 310, a "balloon" or the like may extend from object 310 and provide information about a side, etc.).

Figure 6C:
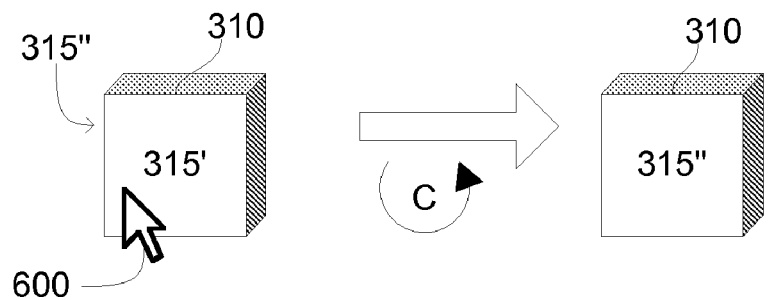

FIG. 6C illustrates another user interaction with object 310. In an embodiment, holding the Shift key while right-clicking object 310 (i.e., right-clicking while a cursor 600 or the like is placed substantially over a selectable region corresponding to object 310) may cause a complete rotation of object 310 to the right as indicated by rotation arrow C (right as viewed from the perspective of a user viewing object 310) to switch from active side 315' to 315".

Figure 6D:
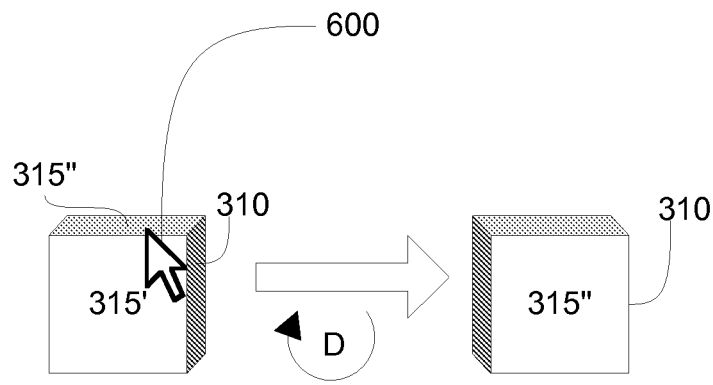

FIG. 6D illustrates yet another user interaction with object 310. In an embodiment, placing cursor 600 over an exposed, inactive side 315" of object 310 and left-clicking results in object switching from active side 315' to 315", as indicated by rotation arrow D. Again, any type of transition may occur as object switches from active side 315' to 315", and an embodiment is not limited to rotation of object 310.

Figure 6E:
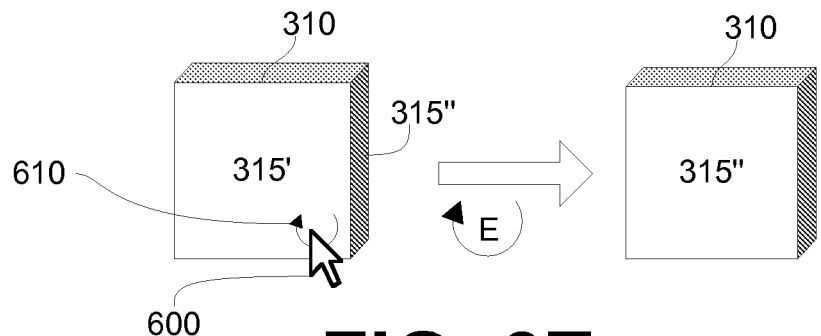

FIG. 6E illustrates another user interaction with object 310. In an embodiment, object 310 may provide emblem 610 that may be displayed on active side 315'. Right-or left-clicking on emblem 610 (or taking some other action while cursor 600 is placed substantially in a selectable region corresponding to emblem 610) may cause a predefined action to occur. For example, left-clicking on emblem 610 may cause object 310 to rotate to the left as indicated by rotation arrow E (left as viewed from the perspective of a user viewing object 310), thereby causing active side 315' to switch to side 315".

Figure 6F:
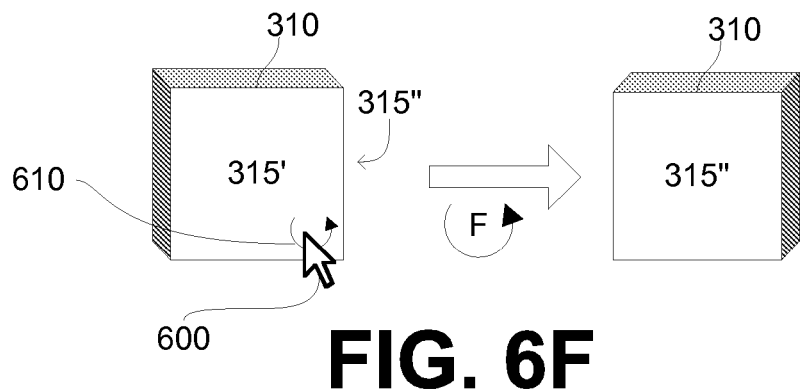

FIG. 6F illustrates yet another user interaction with object 310. In an embodiment, a user depress a Shift key while, for example, left-clicking emblem 610 on active side 315' of object 310 (i.e., left-clicking while cursor 600 is placed substantially in a selectable region corresponding to emblem 610) may cause a predefined action to occur. For example, in response to the Shift key and left-click, object 310 may rotate to the left as indicated by rotation arrow F (left as viewed from the perspective of a user viewing object 310) so as to switch from active side 315' to side 315", even if side 315" is not currently displayed to the user. Thus, a user may rotate object 310 to switch from active side 315' to side 315", even if side 315" is not currently displayed to the user.

As noted above, the object interaction and manipulation methods discussed in connection with FIGS. 6A-F are illustrative only, as any type of object 310 manipulation or interaction is possible. For example, in an alternate embodiment, object 310 may be manipulated by clicking and dragging object 310. Such clicking and dragging may cause any type of effect on object 310 such as, for example, rotating object around one or more axes, etc. Furthermore, more than one object 310 may be so manipulated. For example, a user may select more than one object 310 and then may manipulate all such selected objects 310 by manipulating a single one of the selected objects 310. Alternatively, a manipulation object (not shown) may be presented that enables a user to manipulate one or more of objects 310.

Figure 7:
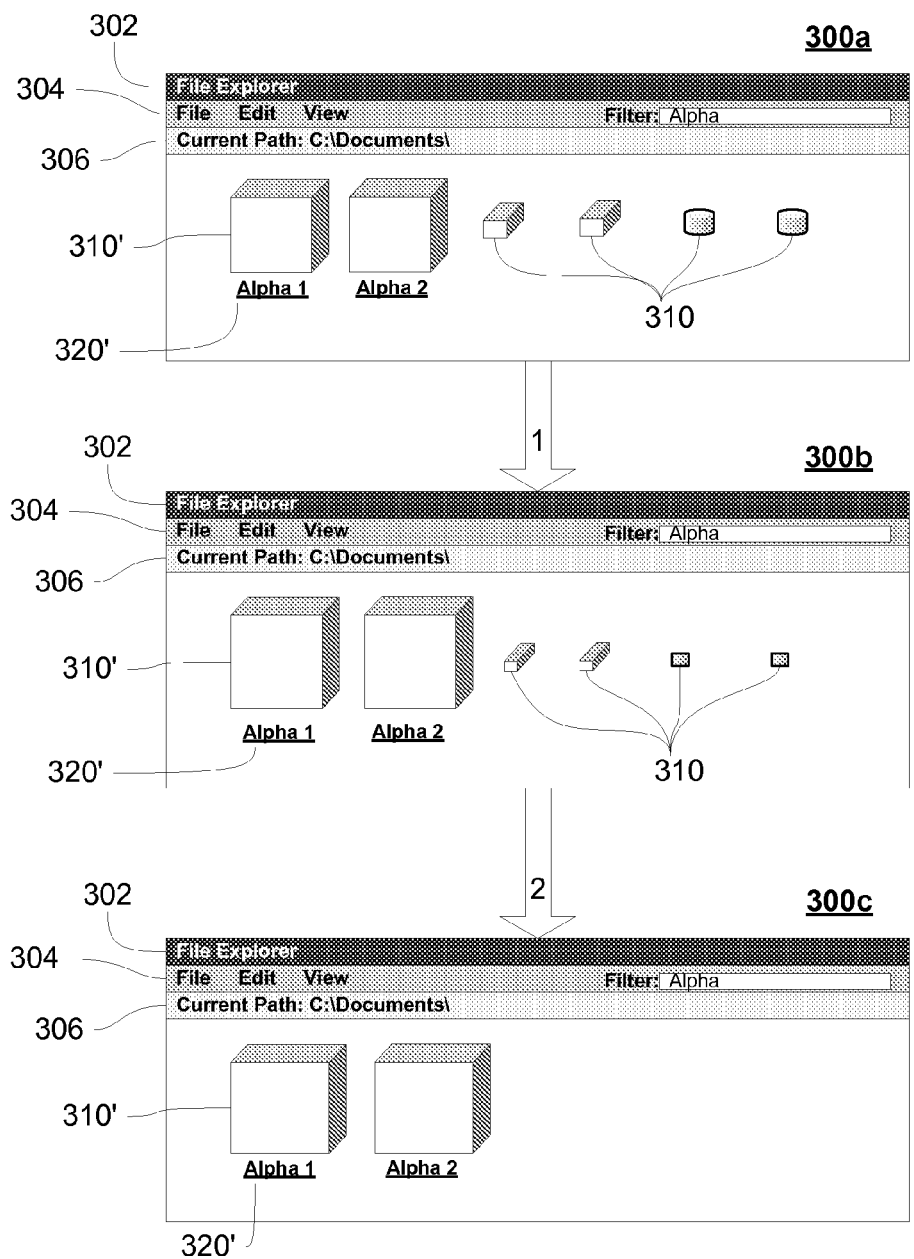
FIG. 7 is a diagram illustrating an example selection transition in accordance with an embodiment.

For purposes of explanation, FIG. 7 provides views 300a-c that illustrate an example transition that may occur when one or more objects 310 are selected. Once again, it will be appreciated that references to file objects 310 apply equally to folder objects 311 (not shown in FIG. 7). In view 300a of FIG. 7, objects 310' entitled (as indicated by file data 320') "Alpha 1" and "Alpha 2" have been selected, while the other objects 310 are not selected. It can be seen that selected objects 310' are larger in size than unselected objects 310. In addition, file data 320' may not be displayed in connection with unselected objects 310.

Arrow 1 illustrates that view 300a changes into view 300b, either in a continuous fashion or discretely. In view 300b, unselected objects 310 have continued to diminish in size, and selected objects 310' have increased in size. Finally, view 300b changes into view 300c, as indicated by arrow 2, in which unselected objects 310 are no longer present. Thus, a user may interact with selected objects 310' without the distraction of unselected objects 310. In an embodiment, a user may deselect objects 310' by, for example, clicking somewhere within viewing area 360 where objects 310' are not located. It will be appreciated that the transition explained above in connection with FIG. 7 is illustrative only, as any type or combination of transitions may occur. For example, unselected objects 310 may remain visible in some type of diminished form. The term "diminished" refers to the overall appearance of unselected objects 310, and does not exclusively mean that unselected objects 310 become smaller. In an alternate embodiment, for example, unselected objects 310 may fade without becoming smaller. If any of selected objects 310' have an associated animation or other transition that occurs when selected, such an animation or transition may or may not occur—depending on predetermined criteria, user preferences or the like—when such an object 310' is selected as part of a group of objects 310'. The entire transition between views 300a-c may take place over any period of time. In an embodiment, the transition is relatively quick (e.g., approximately 1 second or less).

As noted above, FIGS. 6A-F and 7 provide example transitions, as any type of transition, manipulation or interaction with objects is possible according to an embodiment. To further illustrate this point, a few additional example actions are described. For example, when a file associated with an object is opened (e.g., run, loaded, etc.) the object may perform a custom animation such as becoming very large. In some cases, for example, if the file associated with the object is run within a particular application, the object may perform an animation that "opens" the object into a viewing window within which the file is opened by its respective application.

When a folder associated with an object is opened, the object may visually open up and become larger until it fills the entire explorer view (e.g., view 300, file explorer window 302 and/or viewing area 360) with a new view containing its contents. Thus, in an embodiment, the folder itself becomes the current view in the file explorer.

If a user sets a filter on a set of objects and certain objects are to be removed from the view, the objects that are being removed may, for example, become smaller and disappear and the remaining objects re-balance and grow larger to compensate. When a user performs a search where the file explorer finds and displays new objects over time, the visual effect can be, for example, the opposite of that used for a filter. Found objects may start small in the background and quickly grow larger and come into view.

When a user sorts or otherwise does a complete reorganization of objects in a view, the objects may, for example, visually rearrange themselves upon being sorted by moving directly from their current location on-screen to their new location. This may differ from existing GUIs in that the user sees the files moving from one location to another, as opposed to seeing them before the sort and again after the sort, without any sort of transition.

Example Object Configurations

A non-exhaustive list of example object configurations for a folder and a few common file types are provided below. The example object configurations are merely intended to serve as an illustration of the types of shapes and information that may be used in connection with an object and are in no way intended to be limiting. Accordingly, embodiments contemplate object configurations for the listed file types that differ from the configurations listed below.

As noted above, an object can be visually represented as any type of shape. The example objects listed below, and the objects discussed above in connection with FIGS. 3-7, use common shapes such as cubes, cylinders, pyramids and the like, but an embodiment contemplates that an object may take any shape.

Audio File (represented as a cube):
Side 1: Album Cover Art
Side 2: Actions on the Album
Side 3: Mini Music Player
Side 4: Related Music
Side 5: Configuration
Video File (represented as a square or rectangle):
Side 1: Video Preview or Icon
Side 2: Mini Video Player
Image File (represented as a cube):
Side 1: Image Preview
Side 2: Actions on Image
Side 3: Image Metadata
Side 4: Related People
Side 5: Configuration
Video Game File (Arbitrary 3-D shape):
Side 1: 3D Animated Game Logo
Side 2: Game Launch Options
Folder (Arbitrary 3-D shape):
Side 1: Folder Icon+Preview
Side 2: Folder Metadata Embodiments contemplate that objects and object configurations are extensible by users, third-party developers and the like. For example, a developer may add one or more sides to an object to provide application-specific functionality that is not otherwise available. In addition, a developer may create a new object to represent a file of a certain format. For example, a photograph editing application may create a custom object to represent all photograph types. Furthermore, some objects may only have one side, effectively rendering them two-dimensional. An embodiment contemplates that a file explorer window 302 or the like may therefore display 2-D objects, 3-D objects or both. Thus, it will be appreciated that any type of object may be used in connection with an embodiment.

Example Method

Figure 8:
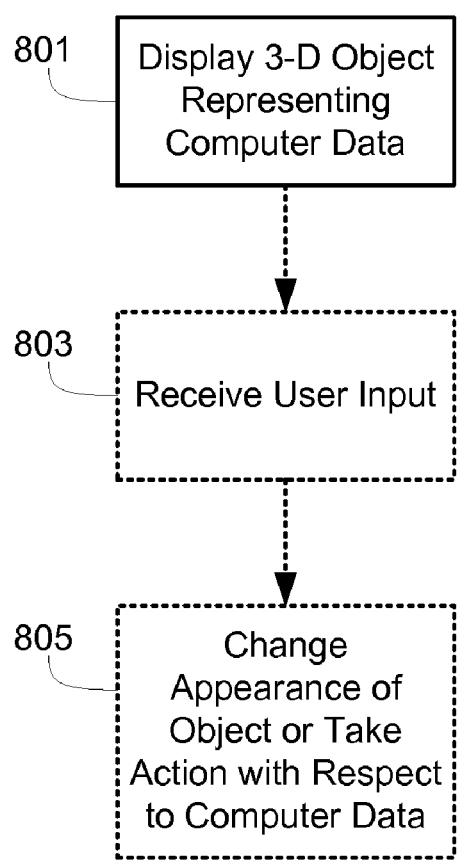
FIG. 8 is a flowchart illustrating an example, non-limiting, method of carrying out an embodiment.

FIG. 8 is a flowchart illustrating an example, non-limiting, method of carrying out an embodiment. At step 801, a three-dimensional object is displayed on a display device. The object may be, for example, file object 310 or folder object 311 as discussed above. The displayed object has a first side in an active position (for example, side 315a of object 310 as discussed above in connection with FIG. 3) and a second side in an inactive position (for example, sides 315b or 315c of object 310 as discussed above in connection with FIG. 3). Steps 803-805 are optional. At optional step 803, user input is received (such as, for example, any of the mouse click or Shift key combinations discussed above in connection with FIGS. 6A-F). At optional step 805, the appearance of the object is modified (such as, for example, discussed above in connection with FIGS. 6A-F and 7). Alternatively, or in combination with modifying the appearance of the object, an action may be taken with respect to the computer data such as, for example, opening or deleting the file, etc., or modifying metadata associated with the file, or the like.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device and at least one output device. One or more programs that may utilize the piracy deterrent techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in example embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while example network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A computer-readable storage medium having computer-executable instructions for performing steps comprising:

associating each of a plurality of file system elements with a respective icon, wherein the file system elements comprise a computer file and/or a computer file directory, wherein each icon is associated with a plurality of sides representing a three-dimensional structure, wherein one of the sides comprises an option to modify a configuration of the three-dimensional structure and an option to apply the configuration to at least one other three-dimensional structure associated with a same type of file system element;

receiving respective information for each of at least one new side associated with each icon, wherein each respective information comprises at least one function available via a respective side;

in response to a first user interaction with a file system, determining a current state, the current state comprising at least a current directory path, and wherein the first user interaction comprises navigating a directory structure or requesting metadata regarding a file system element;

determining a first view of the three-dimensional structure, wherein the first view comprises at least one current icon and respective display information based on the current state, wherein the display information includes a selection status for the at least one current icon and either an active status or an inactive status for each of the plurality of sides associated with the at least one current icon, wherein a selected side is associated with an active status;

displaying on a display device the first view of the three-dimensional structure;

upon receiving a first signal:
determining a second view of the three-dimensional structure, wherein the second view represents a rotation of the three-dimensional structure such that information not viewable in the first view is viewable in the second view; and displaying the second view of the three-dimensional structure while simultaneously maintaining the selected side as having an active status; and upon receiving a second signal, displaying a selected new side and providing for the invocation of a selected respective function described by the associated respective information for the selected new side.

2. The computer-readable storage medium of claim 1, wherein an active side is displayed as facing a user and an inactive side is displayed in at least one of a recessed and non-viewable manner.

3. The computer-readable storage medium of claim 2, wherein a selected icon is displayed larger than an unselected icon.

4. The computer-readable storage medium of claim 3, wherein the first user interaction is one of opening a computer file or folder, modifying a computer file or folder, changing, deleting, requesting information regarding a computer file or folder and adding information relating to a computer file or folder.

5. The computer-readable storage medium of claim 1, further having computer executable instructions for performing the steps comprising:
detecting a second user interaction;
updating the at least one current icon and respective display information as a function of the second user interaction;
displaying on the display device the updated at least one current icon and respective display information.

6. The computer-readable storage medium of claim 5, wherein updating the at least one current icon comprises causing a first side of a selected icon previously having an inactive status to have an active status and a second side of the selected icon previously having an active status to have to an inactive status.

7. The computer-readable storage medium of claim 6, wherein updating at least one current icon further comprises causing the first side to be displayed as facing a user and the second side to be displayed in a recessed manner using a rotation process.

8. The computer-readable storage medium of claim 5, wherein the second user interaction is a mouse click on a selectable portion of an icon.

9. The computer-readable storage medium of claim 8, wherein the mouse click is a right mouse button click, and updating the at least one current icon further comprises displaying at least one action that may be taken with respect to a computer file or folder on an active side of a selected icon.

10. The computer-readable storage medium of claim 5, wherein updating the at least one current icon further comprises causing a first icon previously having an unselected status to have a selected status and a second icon previously having an selected status to have an unselected status.

11. The computer-readable storage medium of claim 10, wherein updating the at least one current icon further comprises causing the first icon to be displayed so that it is larger than the second icon.

12. The computer-readable storage medium of claim 6, wherein updating the at least one current icon further comprises causing the first side to be displayed as facing a user and the second side to be displayed in a non-viewable manner using a rotation process.

13. The computer-readable storage medium of claim 1, further comprising displaying an emblem on an icon, wherein a user action with respect to the emblem causes a predefined action to occur.

14. The computer-readable storage medium of claim 13, wherein the predefined action is to rotate the icon such that a first side associated with the icon is in an inactive position and a second side associated with the icon is in an active position.

15. The computer-readable storage medium of claim 1, wherein the first view comprises a plurality of current icons, further having computer executable instructions for performing the steps comprising:
associating an manipulation object with the plurality of current icons; and
in response to a second user interaction with the manipulation objection, displaying a third view of the plurality of current icons, wherein the third view represents a rotation of the three-dimensional structures of the current icons in the same direction.

16. The computer-readable storage medium of claim 1, wherein the received respective information is specified by an application associated with the file system element, and the received respective information comprises at least one function specific to the application.

17. A display device having rendered thereon a file explorer view, comprising:
a current representation of a state associated with a file system, the state updated upon a user interaction with the file system, wherein the current representation comprises at least one three-dimensional object that represents computer file or folder data, wherein the three-dimensional object has a first and at least a second side, wherein, when one side has an active status and a remainder of the sides have an inactive status, the side having the active status is displayed in a manner to indicate it is active and the remainder of the sides are displayed in a manner to indicate they are inactive, and wherein one of the sides comprising an option to modify a configuration of the three-dimensional object and an option to apply the configuration to at least one other three-dimensional object associated with a same type of file system element;
extensibility information comprising respective information for each of at least one new side associated with a modified three-dimensional object, wherein each respective information comprises at least one function available via a respective side;
wherein the display device:
displays the current representation of the modified three-dimensional object;
upon receiving a first signal:
determines a temporary representation of the three-dimensional object, wherein the temporary representation represents a rotation of the three-dimensional object whereby information not viewable in the current representation may be viewable in the temporary representation; and
displays the temporary representation of the three-dimensional object while simultaneously maintaining the selected side as having an active status; and
upon receiving a second signal, displays a selected new side and provides for the invocation of a selected respective function described by the associated respective information for the selected new side.

18. The display device of claim 17, further comprising a selectable region associated with the three-dimensional object, wherein a user action with respect to the selectable region causes the representation of the three-dimensional object to display the second side as the active side and the first side as the inactive side, and wherein the second side displays a set of information relating to the computer file or folder data represented by the second side.

19. In a computer system having a graphical user interface including a display device and a user interface selection device, a method of providing a representation of computer file or folder data, the method comprising the steps of:
- associating each of a plurality of file system elements with a respective three-dimensional object, wherein the file system elements comprise a computer file and/or folder data, wherein each three-dimensional object has a first side and at least a second side, and wherein one of the sides comprises an option to modify a configuration of the three-dimensional object and an option to apply the configuration to at least one other three-dimensional object associated with the same type of file system element;
- receiving respective information for each of a at least one new side associated with each respective three dimensional object, wherein each respective information comprises at least one function available via a respective side;
- displaying on the display device each three-dimensional object that represents the computer file or the folder data;
- determining a user selected side from a first user input with a file system;
- assigning an active status to said user selected side;
- assigning an inactive status to one or more unselected sides;
- displaying a first set of information pertaining to computer file or folder data represented by the user selected side;
- upon receiving a first signal:
  - determining a second set of information pertaining to computer file or folder data, wherein the second set of information is not viewable via the displaying of the first set of information;
  - displaying the second set of information while simultaneously maintaining the selected side as having an active status; and
  - upon receiving a second signal, displaying a selected new side and providing for the invocation of a selected respective function described by the associated respective information for the selected new side.

20. The method of claim 19, further comprising:
- displaying the first set of information proximate the first side of the three-dimensional object;
- detecting a second user input with respect to the first set of information and
- performing an immediate action according to the second user input.

* * * * *